US012649165B2

(12) United States Patent
Lauer et al.

(10) Patent No.: US 12,649,165 B2
(45) Date of Patent: Jun. 9, 2026

(54) TREATMENT STATION, TREATMENT SYSTEM, AND CORRESPONDING TREATMENT METHOD

(71) Applicant: DÜRR SYSTEMS AG, Bietigheim-Bissingen (DE)

(72) Inventors: Michael Lauer, Bietigheim-Bissingen (DE); Oliver Seyboth, Hemmingen (DE); Nico Stutznäcker, Sachsenheim (DE)

( * ) Notice: Subject to any disclaimer, the term of this patent is extended or adjusted under 35 U.S.C. 154(b) by 0 days.

(21) Appl. No.: 18/691,762

(22) PCT Filed: Sep. 14, 2022

(86) PCT No.: PCT/DE2022/100683
§ 371 (c)(1),
(2) Date: Mar. 13, 2024

(87) PCT Pub. No.: WO2023/041115
PCT Pub. Date: Mar. 23, 2023

(65) Prior Publication Data
US 2025/0128283 A1 Apr. 24, 2025

(30) Foreign Application Priority Data
Sep. 15, 2021 (DE) ..................... 10 2021 210 225.5

(51) Int. Cl.
*B05C 3/10* (2006.01)
*B05C 3/109* (2006.01)
(Continued)

(52) U.S. Cl.
CPC ................ *B05C 3/109* (2013.01); *B05D 1/18* (2013.01); *B08B 3/108* (2013.01)

(58) Field of Classification Search
CPC ............ B05C 3/109; B08B 13/00; B08B 3/08
See application file for complete search history.

(56) References Cited

U.S. PATENT DOCUMENTS 4,106,661 A * 8/1978 Hunt ..................... E06B 7/2318
220/849
4,909,242 A * 3/1990 Bloom ..................... F16J 15/46
601/154
(Continued)

FOREIGN PATENT DOCUMENTS

CN 209901855 U * 1/2020 ............... B08B 3/02
CN 210059168 U 2/2020
(Continued)

OTHER PUBLICATIONS

Xie. CN-209901855-U translation. Feb. 14, 2020 (Year: 2020).*
(Continued)

*Primary Examiner* — Cachet I Proctor
(74) *Attorney, Agent, or Firm* — Hanley, Flight & Zimmerman, LLC

(57) ABSTRACT

In order to provide a treatment station for treating workpieces—in particular, for cleaning and/or coating vehicle bodies—which allows efficient workpiece treatment, it is proposed that the treatment station comprise a treatment container which surrounds a treatment chamber for receiving the workpieces, wherein the treatment chamber can be flooded with a fluid, wherein the treatment container comprises at least one access opening for introducing the workpieces into the treatment chamber and/or for removing the workpieces from the treatment chamber, wherein the treatment container comprises a closing device which comprises a closing element for selectively closing and opening the at least one access opening.

17 Claims, 13 Drawing Sheets

(51) Int. Cl.
*B05D 1/18* (2006.01)
*B08B 3/10* (2006.01)

(56) References Cited

U.S. PATENT DOCUMENTS

| | | | | |
|---|---|---|---|---|
| 2002/0133886 | A1* | 9/2002 | Severns | C11D 3/40 8/142 |
| 2005/0017728 | A1* | 1/2005 | Kaiser | G01N 27/221 324/453 |
| 2005/0066997 | A1* | 3/2005 | Watford | B60S 3/00 134/123 |
| 2009/0211605 | A1* | 8/2009 | Ahmad | B60S 1/528 134/123 |
| 2017/0044707 | A1* | 2/2017 | Schurr | D06F 58/04 |

FOREIGN PATENT DOCUMENTS

| | | | | |
|---|---|---|---|---|
| CN | 111495834 | A | 8/2020 | |
| DE | 3814014 | A1 * | 11/1989 | B08B 3/02 |
| DE | 4244693 | A1 | 1/1994 | |
| DE | 4306176 | A1 | 9/1994 | |
| DE | 102005051385 | A1 | 5/2007 | |

OTHER PUBLICATIONS

International Searching Authority, “International Search Report and Written Opinion,” issued in connection with International Application No. PCT/DE2022/100683, Dec. 15, 2022, 14 pages, with English translation of the International Search Report.

* cited by examiner

TREATMENT STATION, TREATMENT SYSTEM, AND CORRESPONDING TREATMENT METHOD

RELATED APPLICATION

This application is a national phase of international application No. PCT/DE2022/100683 filed on Sep. 14, 2022, and claims the benefit of German application No. 10 2021 210 225.5 filed on Sep. 15, 2021, which are incorporated herein by reference in their entirety and for all purposes.

FIELD OF DISCLOSURE

The present disclosure relates to the field of workpiece treatment—in particular cleaning and coating workpieces—for example, vehicle bodies or vehicle parts.

BACKGROUND

For the treatment of workpieces, the latter can be dipped into dip tanks, for example. In this case, the workpieces are lowered into a dip tank, for example, and are removed from the dip tank after a treatment step. In doing so, a rotation of the workpiece for optimal treatment of the same even at locations that are difficult to access may also be provided.

In such dip treatment systems, it may be disadvantageous if workpieces of different sizes and/or shapes are to be treated and/or if different treatment durations are provided for various workpieces.

Alternatively to dipping workpieces, a flooding of a treatment chamber can also be provided in order to treat a workpiece arranged therein. If the workpieces are to be inserted laterally into the treatment chamber for this purpose, an access opening must be reliably sealed.

SUMMARY

Examples disclosed herein are based upon the object of providing a treatment station which enables reliable workpiece treatment using economical components.

This object is achieved by the treatment station according to independent claim 1.

A treatment station is in particular a component of a treatment system and serves for treating workpieces.

A treatment station preferably comprises a treatment container which surrounds a treatment chamber for receiving the workpieces.

Furthermore, it can be provided that a treatment station comprise a plurality of such treatment containers.

It is preferably provided that the treatment chamber be able to be flooded with a fluid.

The fluid is in particular a treatment fluid, e.g., a cleaning fluid—in particular, for degreasing the workpieces. Furthermore, it can be provided that the fluid be a coating fluid—for example, for phosphating or painting the workpieces.

It can be provided that the treatment container comprise at least one access opening for introducing the workpieces into the treatment chamber and/or for removing the workpieces from the treatment chamber.

The treatment container preferably comprises a closing device for selectively closing and opening the at least one access opening.

Optional closing and opening means in particular that the closing device can be brought alternatively a) into a closed position or b) into an open position according to the choice of a user and/or a system control—in particular, one after the other into a closed position and then into an open position for each workpiece.

It can be provided that the treatment container comprise a single access opening for introducing the workpieces into the treatment chamber and for removing the workpieces from the treatment chamber.

Alternatively, it can be provided that the treatment container comprise an access opening for introducing the workpieces into the treatment chamber and a further access opening for removing the workpieces from the treatment chamber, wherein the access openings are then arranged in particular on opposite sides or ends or end walls of the treatment container.

It can be advantageous if at least one access opening is arranged and/or formed in one or more side walls of the treatment container—in particular, in one or more end walls of the treatment container.

The treatment container is in particular substantially cuboid and preferably comprises a ceiling wall which is for example closed or open, a closed bottom wall, two or three closed side walls, and two further or one further side wall which is provided with at least one access opening, wherein the at least one access opening is preferably completely closable by means of the closing device.

It can be advantageous if the closing device is used for fluid-tight closing of the at least one access opening.

For this purpose, the closing device comprises in particular a closing element which, for example, is self-locking and/or is provided with a self-locking mechanism and/or with a self-locking seal.

Furthermore, it can be provided that at least one toggle lever be used or be able to be used to ensure the sealing effect of the closing device—in particular, in order to press a closing element against a sealing device.

It can be advantageous if the closing device comprises a lifting device for raising and lowering a closing element of the closing device—in particular, for raising the closing element in order to bring it into an open position, and/or for lowering the closing element in order to bring it into a closed position. By means of an optional counterweight of the closing device, an energy consumption for the operation of the closing device can preferably be minimized. For this purpose, the counterweight is preferably lifted using the positional energy of the closing element when the closing element is lowered. Furthermore, the closing element is preferably lifted using the positional energy of the counterweight when the closing element is to be lifted.

Furthermore, it can be provided that the closing element be able to be lowered by means of the lifting device in order to bring it into an open position, and/or be able to be lifted in order to bring it into a closed position.

Such a closing element can, for example, be a gate—in particular, a floodgate.

The closing element may, for example, be formed in one piece and may be movable as a whole. Alternatively thereto, it can be provided that the closing element be designed in multiple parts, wherein the parts of the closing element can preferably be moved independently of one another or execute different movements from one another in order to close or open the access opening.

Alternatively or additionally, it can be provided that the closing device comprise a sliding device for, for example, lateral displacement of the closing element in order to optionally bring it into an open position or into a closed position.

Furthermore, it can be provided that the closing device comprise a pivoting device for pivoting a closing element of the closing device, wherein the closing element is in particular pivotable about an at least approximately horizontal pivot axis. Alternatively thereto, it can be provided that the closing element be pivotable about an at least approximately vertical pivot axis.

It can be advantageous if one or more closing elements—in particular, at least one flap element—comprise or form one or more conveying elements of a conveyor device. In particular, it can be provided that one or more roller elements of a conveyor device designed as a roller conveyor be arranged on one or more closing elements.

It can be advantageous if one or more closing elements of the closing device form part of the conveyor device or carry or accommodate part of the conveyor device.

The closing device preferably comprises a closing drive for automatically moving a closing element of the closing device—in particular, for automatically bringing the closing element into the open position and/or into the closed position.

The closing drive can, for example, act electrically or pneumatically or hydraulically upon the closing element in order to selectively bring it into an open position or into a closed position. In this case, one or more electric motors and/or spindle gears and/or thrust chains and/or rope winches and or winding drives may, for example, be provided for moving the closing element.

For example, it can be provided that the closing element be able to be lifted and lowered by means of one or more winding belts, wherein the one or more winding belts can be wound and unwound for this purpose in particular by means of one or more winding drives.

Furthermore, it can be provided that the force of gravity be used to move the closing element, e.g., by mechanical coupling of two closing elements, wherein a closing element is lowered and thereby a further closing element is lifted, or at least its lifting is simplified.

It can be advantageous if the treatment station comprises a fluid tank for receiving a fluid—in particular, a treatment fluid.

For flooding the treatment chamber, the fluid can preferably be introduced from the fluid tank into the treatment chamber by means of a fluid guide.

For emptying the treatment chamber, the fluid can preferably be guided from the treatment chamber back into the fluid tank by means of the fluid guide.

A direct connection between the treatment chamber and the fluid tank may be provided both for flooding and for emptying. Alternatively, one or more intermediate stations or other devices to be flowed through may be provided.

The treatment station preferably comprises a conveying device for conveying the workpieces—in particular, for introducing the workpieces into the treatment chamber, and/or for removing the workpieces from the treatment chamber, and/or for conveying the workpieces from one treatment station to the next.

It can be advantageous if the conveyor device comprises one or more roller conveyors, lifting conveyors, sliding conveyors, and/or stacker cranes for conveying and/or moving the workpieces—in particular, for introducing the workpieces into the treatment chamber, and/or for removing the workpieces from the treatment chamber, and/or for conveying the workpieces from one treatment station to the next.

Alternatively or additionally, it can be provided that the conveying device comprise one or more driverless transport systems for conveying and/or moving the workpieces—in particular, for introducing the workpieces into the treatment chamber, and/or for removing the workpieces from the treatment chamber, and/or for conveying the workpieces from one treatment station to the next.

In one embodiment of examples disclosed herein, it can be provided that the conveying device comprise a plurality of conveying device sections with conveyor technology different from one another with regard to a drive device and/or with regard to receiving and guiding the workpieces, wherein the workpieces can preferably be conveyed by means of a first conveying device section into a region upstream of a treatment container of a treatment station, and wherein the workpieces can be introduced into the treatment chamber of the treatment station by means of a second conveying device section different therefrom.

For example, it can be provided that one or more roller conveyors be provided outside the treatment chambers for conveying the workpieces, and that the workpieces be able to be pushed into and/or pushed or pulled out of the treatment chambers by means of one or more sliding conveyors.

It can be advantageous if one or more workpieces are arranged on a workpiece carrier. A workpiece carrier is in particular a skid—preferably for receiving a workpiece designed as a vehicle body.

The workpieces are then preferably conveyed and/or moved together with the workpiece carrier, so that the phrase, "conveying the workpieces" or "moving the workpieces," can also mean conveying or moving at least one workpiece carrier together with at least one workpiece arranged thereon.

The treatment station can in particular be a component of a treatment system—for example, a painting system.

The treatment station preferably comprises a control device by means of which a flooding process in the treatment chamber can be controlled and/or regulated—in particular, by controlling and/or regulating a valve device for opening and closing a supply line for supplying fluid to the treatment chamber.

While flooding one or more treatment chambers, the liquid level is preferably raised from a minimum level to at least approximately 50%, and preferably at least approximately 70%, e.g., at least approximately 90%, of an overall interior height of the treatment chamber and/or an overall height of a closing element of the closing device in the closed state thereof.

To empty one or more treatment chambers, the fluid contained therein—in particular, the treatment fluid—is preferably removed from the treatment chamber by at least approximately 50%—in particular, at least approximately 80%—for example, at least approximately 90%.

A flooding process and an emptying process are preferably performed for each workpiece or each group of workpieces which is or are introduced separately into the treatment chamber.

In one embodiment of examples disclosed herein, it is provided that the treatment system comprise a plurality of first treatment stations for carrying out a first step and a plurality of second treatment stations for carrying out a second treatment step, wherein, in each case, one or more first treatment stations and one or more second treatment stations are preferably part of a treatment unit of the treatment system or form it, through which the workpieces pass in order to perform the treatment steps.

It can be advantageous if the treatment station comprises a treatment container which surrounds a treatment chamber for receiving the workpieces, wherein the treatment chamber can be flooded with a fluid, wherein the treatment container comprises at least one access opening for introducing the workpieces into the treatment chamber and/or for removing the workpieces from the treatment chamber, wherein the treatment container comprises a closing device which comprises a closing element for selectively closing and opening the at least one access opening.

It can be advantageous if the treatment station comprises a guide device for guiding the closing element, wherein the guide device comprises one or more vertical guide sections—in particular, four vertical guide sections—and one or more locking sections—in particular, four locking sections.

The one or more locking sections—in particular, the four locking sections—preferably run transversely—in particular, obliquely—to the one or more vertical guide sections—in particular, the four vertical guide sections.

It can be provided that the one or more vertical guide sections—in particular, the four vertical guide sections—be arranged and/or aligned at least approximately parallel to a wall-side sealing surface of the treatment container.

It can be advantageous if the one or more locking sections—in particular, the four locking sections-each connect to a lower end—in the vertical direction—of a vertical guide section.

As an alternative or in addition thereto, it can be provided that the one or more locking sections—in particular, the four locking sections—extend starting from a vertical guide section in the direction of a wall-side sealing surface of the treatment container.

In the region of the end position in the closed position of the closing element, the guide tracks preferably have slotted guides which are in particular shaped such that the closing element approaches the sealing surface and/or the sealing element shortly before the end position (closed position) is reached. The sealing element is clamped between the sealing surface and the closing element and is compressed by the contact pressure of the sealing element along its entire length—preferably to such an extent that a sufficient sealing effect is achieved to start the flooding process. The main movement of the closing element—in particular, a lowering up to just before the closed position is reached—preferably takes place at a great enough distance from the sealing surface that the closing element does not touch the sealing element, as a result of which it can be protected from wear.

The preferably four locking sections—in particular, the four slotted guides—are preferably designed to be variably adjustable in relation to each other in order to be able to align the closing element in its end position plane-parallel to the sealing surface during assembly.

The closing element is preferably fixed in the end position (closed position) solely by gravity and/or the fluid pressure when the treatment container is full. The geometry of the slotted guide is preferably selected such that the applied fluid pressure cannot cause a vertical movement of the closing element. After reaching the minimum distance from the sealing surface, the closing element is thereby preferably lowered further vertically by a few centimeters so that the guide rollers rest in a vertically aligned part of the guide rails.

It can be advantageous if the sealing device comprises one or more spacers or stoppers which are arranged in particular distributed along the sealing element and/or are designed to extend along the sealing element. This preferably specifies a limit for the maximum compression of the sealing element in order to protect it from damage.

Alternatively or in addition thereto, it can be provided that the maximum sealing compression be predetermined by a corresponding shaping of the guide slots—in particular, to prevent the closing element from approaching too close to the sealing surface surrounding the access opening.

The closing element is preferably displaceably mounted on the one or more vertical guide sections—in particular, the four vertical guide sections—and/or on the one or more locking sections—in particular, the four locking sections—by means of a plurality of guide rollers and/or support rollers of the guide device.

In particular, it can be provided that the closing element be mounted so as to be height-adjustable, wherein a movement of the closing element in one or more horizontal directions is limited by means of the guide rollers and/or support rollers—in particular, fixed due to the shape of one or more guide rollers—or completely prevented.

It can be advantageous if the closing element can be displaced unchanged in a uniform rotational alignment along the one or more vertical guide sections—in particular, along the four vertical guide sections—and/or along the one or more locking sections—in particular, along the four locking sections.

Preferably, no tilting or rotation of the closing element takes place while it is brought from the open position into the closed position or from the closed position into the open position.

The closing element is preferably movable by means of the one or more locking sections—in particular, the four locking sections—onto a wall-side sealing surface of the treatment container. In particular, a sealing element can thereby be received in a clamping and/or sealing manner between the closing element and the treatment container.

It can be advantageous if the guide device and/or the closing element are arranged on an inner side, facing the treatment chamber, of a side wall—in particular, an end wall—of the treatment container. In particular, this allows a fluid pressure acting upon the closing element to be usable for optimizing pressing against a sealing element and accordingly for optimizing a sealing effect of the sealing device.

The closing element can in particular be guided on or along an inner side of the side wall or can be applied thereto.

Alternatively, it can be provided that the guide device and/or the closing element be arranged on an outer side, facing away from the treatment chamber, of a side wall—in particular, an end wall—of the treatment container. Guide rollers and/or support rollers of the guide device are thereby preferably arranged outside the treatment chamber, whereby in particular contamination thereof by fluid contact can be avoided.

In one embodiment of examples disclosed herein, it can be provided that the closing device comprise a lifting device for raising and lowering a closing element of the closing device—in particular, for lifting the closing element in order to bring it into an open position, and for lowering the closing element in order to bring it into a closed position—wherein the lifting device in particular comprises a winding drive, belt drive, or chain drive.

It can be advantageous if the treatment station comprises a sealing device for sealing a gap between the treatment container and the closing element in the closed state thereof.

The sealing device preferably comprises a sealing region—in particular, a sealing surface—which surrounds the access opening in an annularly closed or at least U-shaped manner. A sealing element is in particular designed in one piece or in one part and preferably extends continuously along the sealing region—in particular, along the annularly closed or at least U-shaped sealing region which surrounds the access opening.

A U-shaped sealing region is in particular to be understood as an extension thereof in such a way that two, substantially vertical sealing region sections project upwards starting from two, mutually oppositely arranged ends of a substantially horizontal sealing region section.

The sealing device preferably comprises one or more sealing elements designed as elastic profile seals.

For example, it can be provided that the sealing device comprise one or more expandable sealing elements which can be selectively brought into a sealing expansion and into a release expansion—in particular, by introducing an expansion material.

In the sealing expansion, the sealing element is preferably expanded. In the release expansion, the sealing element is preferably relaxed, as a result of which in particular direct contact with the closing element has not yet been made, interrupted, or ended—in particular, to prevent abrasion or other damage to the sealing element when the closing element is moved.

In particular, a gas, e.g., air, or a liquid, e.g., water or a substance containing water, can be provided as the expansion material. For selective expansion or relaxation of the sealing element, a control device in particular is provided, by means of which a pressure and/or a quantity of the supplied or discharged expansion material can preferably be controlled and/or regulated. In particular, this makes it possible to readjust the pressure and/or the amount of supplied fluid in the sealing expansion in order to achieve and maintain a reliable sealing effect.

The sealing device can optionally comprise one or more primary sealing elements and one or more secondary sealing elements for functionally supporting the one or more primary sealing elements.

The secondary sealing element serves in particular for sealing in the event of a failure of the primary sealing element and/or for reinforcing the sealing effect of the primary sealing element. Furthermore, the secondary sealing element can preferably serve for optimized compensation for varying gap strengths.

It can be advantageous if the sealing device comprises a fluid collection device by means of which fluid exiting the gap can be received. The fluid collection device is in particular a collecting tray which is arranged on or below a side wall of the treatment container on which the access opening is arranged and/or formed. By means of an optional sensor device, it can preferably be detected—in particular, monitored—whether an exiting fluid quantity and/or an exiting fluid volume flow are within predefined limit values. If an exiting fluid quantity and/or an exiting fluid volume flow exceed an associated limit value, undesired and/or impermissible leakage of the sealing device can preferably be inferred.

The guide device is preferably arranged completely outside the treatment chamber. The guide rollers thus preferably do not come into contact with the fluid, or at least the guide tracks are not flooded with the fluid.

In particular, in order to use a fluid pressure within the treatment chamber to press the closing element against the sealing element, it can be provided that the closing element comprise a projection engaging behind or around the sealing element. The projection is in particular arranged and/or designed such that the sealing element is arranged between the projection and the guide tracks.

For example, it can be provided that the sealing element project with a sealing element seat bearing the sealing element into a spatial region arranged between the projection and the guide tracks.

The sealing element seat can optionally comprise a stopper and/or a spacer-preferably in order to be able to limit a maximum deformation of the sealing element.

Optionally, in the closing device, an additional seal can be provided on an upper end, with respect to the direction of gravity, of the closing element. Such an additional seal can be advantageous in particular if the closing element is guided in a gap or through a gap in the ceiling region of the treatment container, and, under certain circumstances, vapors or other media could escape through this gap.

The additional seal can in particular comprise an additional sealing element which is arranged, for example, on the treatment container and acts against the closing element. Alternatively, the additional sealing element can be arranged on the closing element and act against the treatment container.

The closing element can comprise, for example, a pressing section—in particular, a pressing projection—against which the additional sealing element can be pressed or is pressed—in particular, in a closed state of the closing element.

The additional sealing element can, for example, comprise a sealing lip part or brush part which, in each position of the closing element, covers or bridges a gap between the treatment container and the closing element, and thus at least largely closes the same.

Alternatively or in addition thereto, it can be provided that the additional sealing element comprise a pressed part which is sealingly pressed against the closing element—in particular, exclusively—in a closed position of the closing element. The pressed part is in particular a rubber lip or another elastic seal.

Furthermore, alternatively or additionally, it can be provided that a pressing section—in particular, a pressing projection—form the additional sealing element and, in particular, act against the treatment container in the closed state of the closing element in order to at least largely close a gap between the treatment container and the closing element.

In a further embodiment of examples disclosed herein, a holding element—in particular, a holding rail—can be provided in addition or alternatively to the above-mentioned features. The holding element is preferably arranged on a side, facing away from the interior of the treatment container, of the sealing element and limits the range of movement of the sealing element. This can preferably prevent the sealing element from being displaced in the gap or even moved out of the gap due to pressure.

The holding element is preferably dimensioned such that it virtually, but not completely, bridges and/or fills a gap between the treatment container and the closing element when the sealing element is compressed to the maximum.

The holding element is arranged, for example, on the closing element and does not come into contact with the treatment container. Alternatively to this, it can be provided that the holding element be arranged on the treatment container and not come into contact with the closing element.

The treatment station according to examples disclosed herein is in particular suitable for use as a component of a treatment system.

Examples disclosed herein also relate to a treatment system—in particular, a cleaning system or painting system—wherein the treatment system preferably comprises one or more treatment stations according to examples disclosed herein.

Examples disclosed herein relate to a method for treating workpieces.

In this respect, examples disclosed herein are based upon the task of providing a process which enables reliable workpiece treatment using economical components.

According to examples disclosed herein, this task is achieved by a method for treating workpieces according to the independent method claim.

The method for treating workpieces—in particular, for cleaning and/or coating vehicle bodies, e.g., using a treatment station or a treatment system—preferably comprises the following:

- introducing the workpieces through at least one access opening into a treatment chamber which can be flooded with a fluid and which is surrounded by a treatment container of a treatment station; and
- optionally closing and opening the at least one access opening by means of a closing element of a closing device of the treatment container.

The method preferably has one or more of the features and/or advantages described in connection with the treatment station device according to examples disclosed herein and/or the treatment system according to examples disclosed herein. The method can preferably be carried out using the treatment station according to examples disclosed herein and/or the treatment system according to examples disclosed herein. The treatment station according to the invention and/or the treatment system according to examples disclosed herein are preferably designed and/or configured accordingly.

Further preferred features and/or advantages of examples disclosed herein form the subject matter of the following description and the drawings illustrating exemplary embodiments.

DETAILED DESCRIPTION OF THE DRAWINGS

Figure 1:
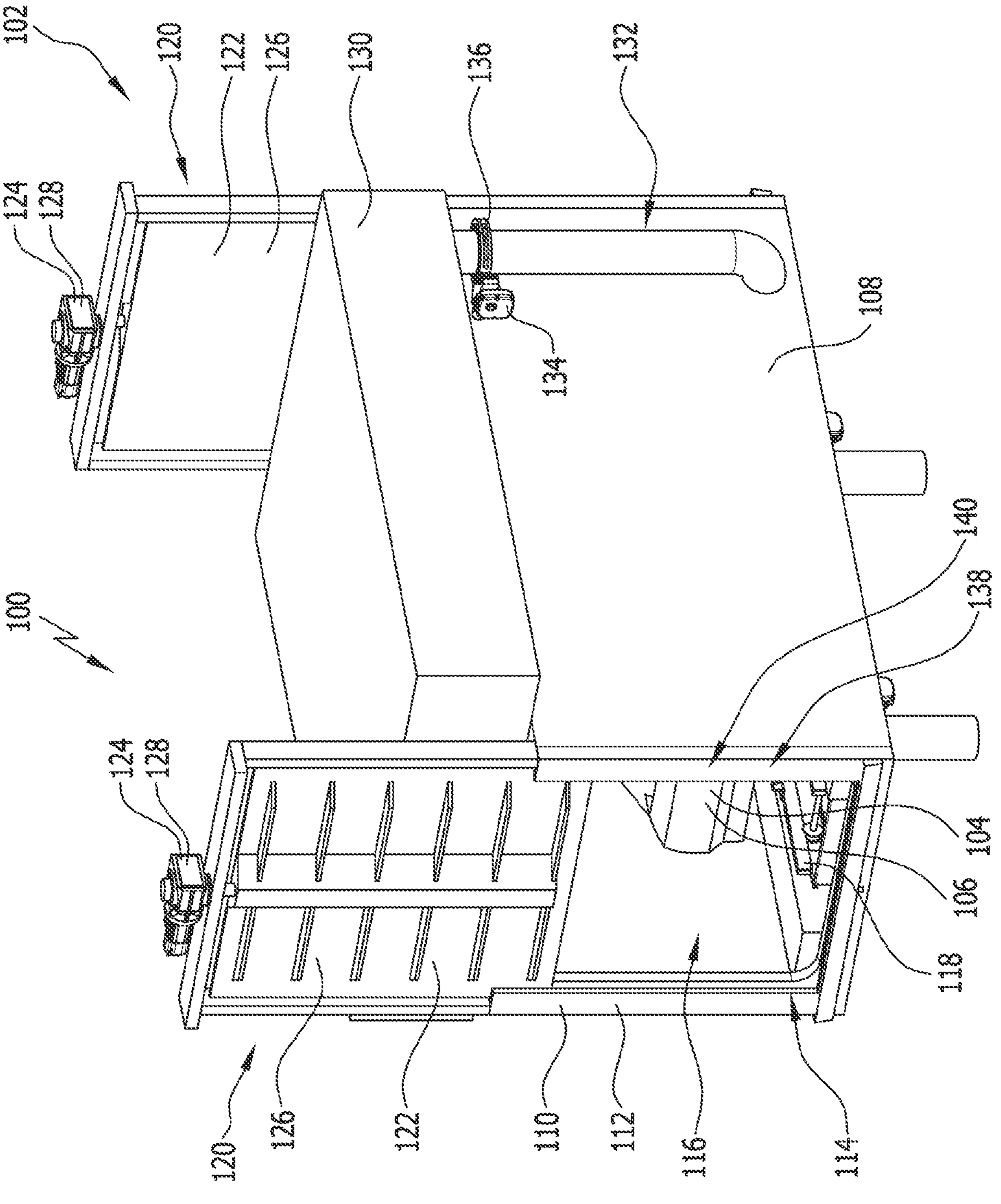
FIG. 1 shows a schematic perspectival view of a treatment station of a treatment system in which a treatment container can be closed by means of at least one closing device.
Figure 2:
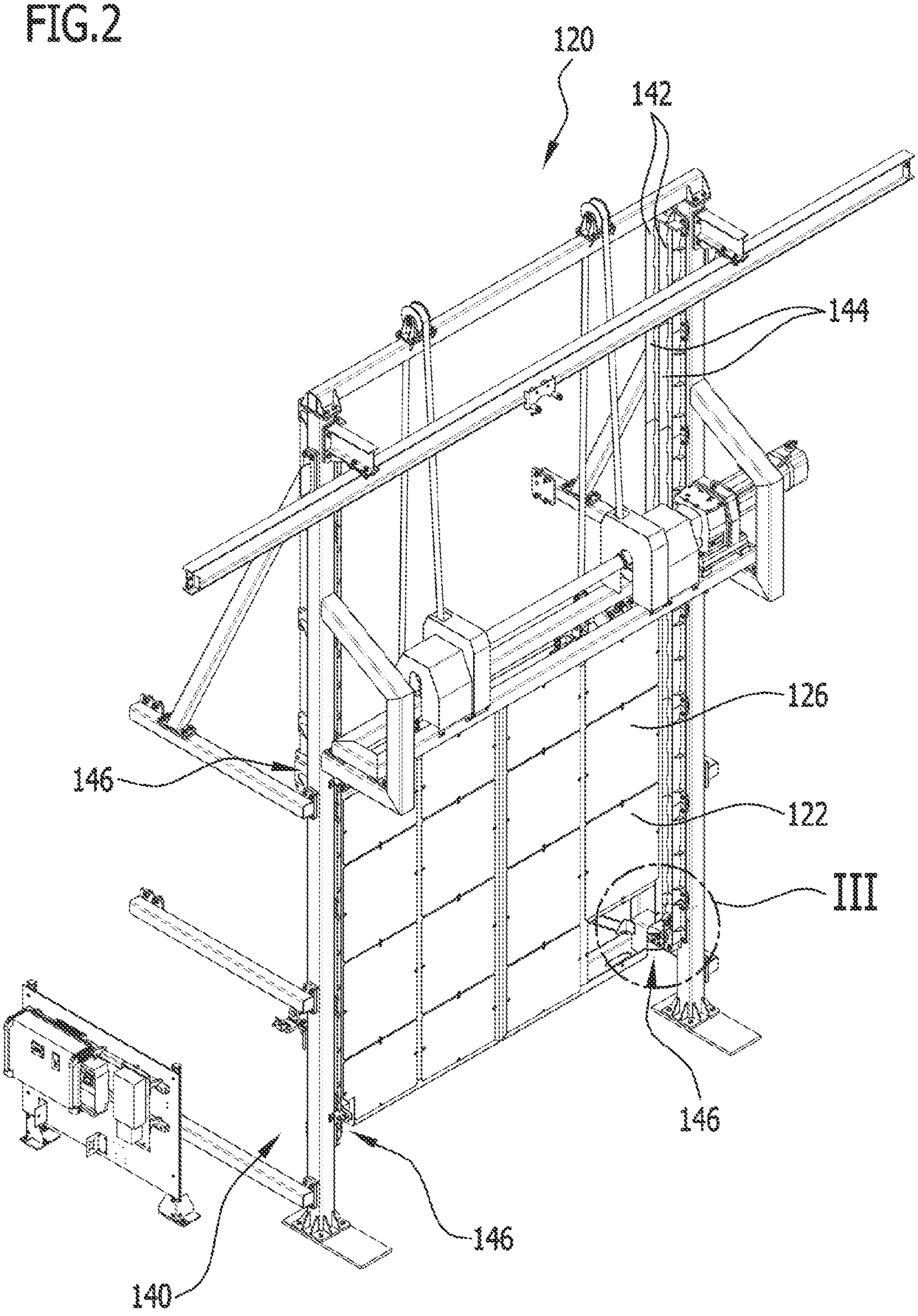
FIG. 2 shows a schematic perspectival view of an alternative embodiment of a closing device for use in the treatment station from FIG. 1.
Figure 3:
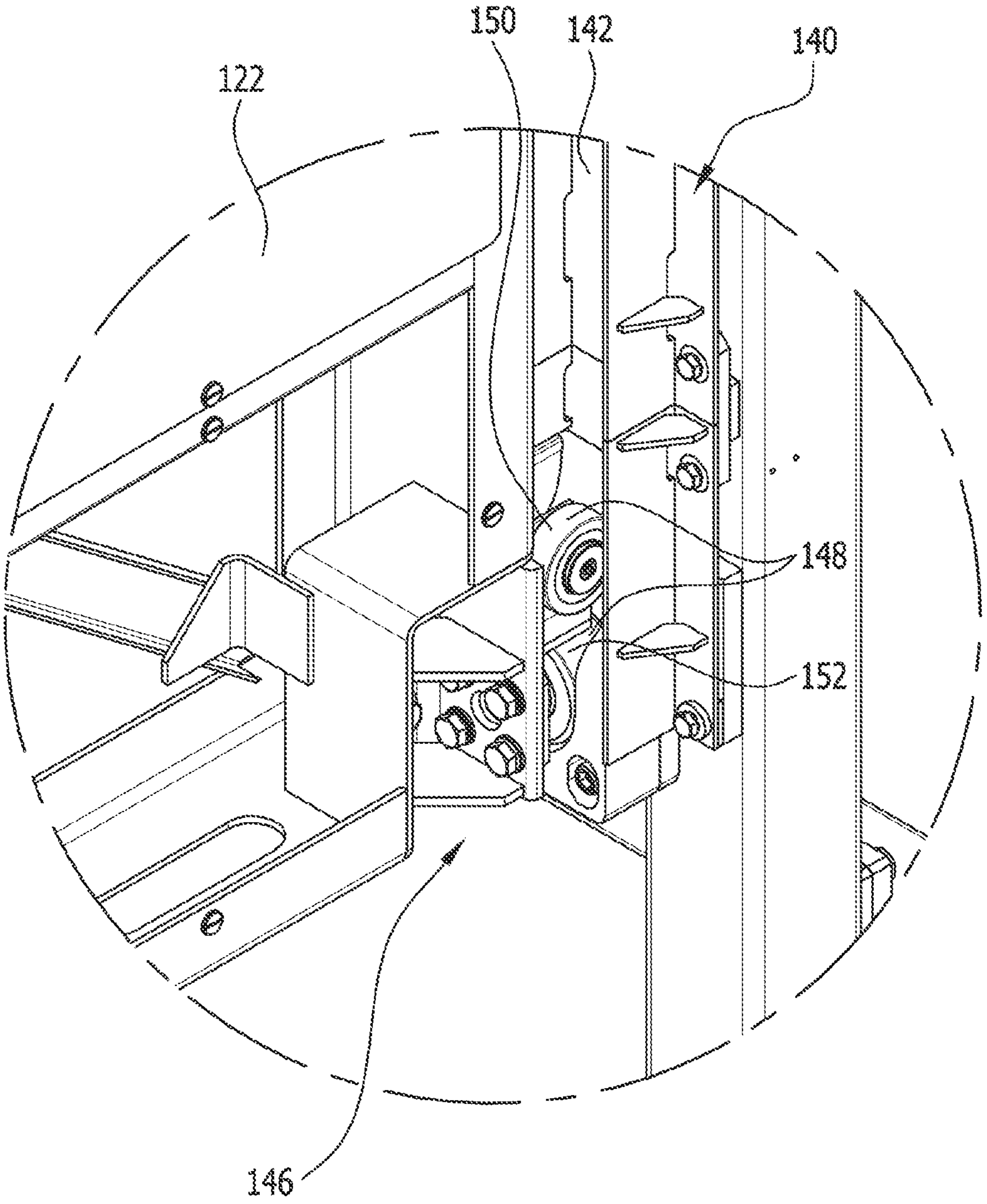
FIG. 3 shows an enlarged representation of region III in FIG. 2.

A treatment station shown in FIG. 1 and denoted as a whole by 100 is in particular a component of a treatment system 102 and serves to carry out cleaning and/or coating processes on workpieces 104—for example, vehicle bodies 106.

In a treatment system 102, in particular a plurality of such treatment stations 100 can be provided.

The treatment station 100 comprises a treatment container 108 in which a workpiece 104 can be accommodated.

The treatment container 108 comprises a plurality of side walls 110, wherein an access opening 114 is formed in one or two of the side walls 110—in particular, in opposite end walls 112.

The workpiece 104 can be introduced into and/or removed from a treatment chamber 116 of the treatment container 108 through the access opening 114.

A conveying device 118 is provided in particular for conveying the workpieces 104.

The treatment station 100 comprises—in particular, for each access opening 114—a closing device 120 by means of which the corresponding access opening 114 can be closed.

For this purpose, the closing device 120 comprises a closing element 122 which can be brought partially into a closed position or an open position by means of a closing drive 124.

The closing element 122 is in particular a gate 126.

The closing drive 124 is in particular a lifting device 128—for example, an electric drive.

By means of the closing drive 124, the closing element 122 is preferably liftable in order to open the access opening 114 and lowerable in order to close the access opening 114.

The treatment station 100 further comprises a fluid tank 130 which is connected to the treatment chamber 116 by means of a fluid guide 132. Fluid from the fluid tank 130 can accordingly be supplied to the treatment chamber 116 via the fluid guide 132—in particular, in order to flood the treatment chamber 116 at least sectionally.

By means of a control device 134 and/or a valve device 136 of the treatment station 100, the flooding process is preferably controllable and/or regulatable.

In order to avoid an undesired drainage of fluid from the treatment chamber 116, the closing device 120 preferably comprises a sealing device 138 by means of which in particular a gap can be sealed between the closing element 122 and the side wall 110.

Furthermore, the closing device 20 preferably comprises a guide device 140 by means of which the closing element 122 can be reliably brought into a predetermined closed position in order to ensure the sealing function of the sealing device 138.

In particular, the closing element 122 can be guided in contact along a sealing element, yet to be described, of the sealing device 138 in order to always ensure contact with the sealing element and thus correct positioning of the closing element 122 relative to the sealing element. However, this can result in increased wear of the sealing element, which can impair a long-term sealing effect.

By means of an optimized closing device 120, the sealing effect can preferably also be maintained long-term. For this purpose, the closing device 120 can be designed, for example, according to the embodiment shown in FIGS. 2 to 5.

The embodiment of the closing device 120 shown in FIGS. 2 to 5 can in particular be provided instead of the closing device 120 shown in FIG. 1. Moreover, a treatment station 100 which is provided with the embodiment of a closing device 120 shown in FIGS. 2 to 5 preferably corresponds to the treatment station 100 shown in FIG. 1 with regard to individual or several features relating to the structure and/or the function, so that reference is made to the above description thereof in this respect.

The embodiment of the closing device 120 shown in FIGS. 2 to 5 comprises a guide device 140 which comprises a plurality of guide tracks 142 for guiding the closing element 122 from the open position into the closed position. Each guide track 142 comprises a vertical guide section 144 and a locking section 146. Each guide track 142 can optionally serve to reinforce the closing device 120 and/or to reinforce the treatment container 108.

The locking section 146 of each guide track 142 is arranged in particular on a lower end, with respect to the direction of gravity, of the vertical guide section 144 of the corresponding guide track 142.

The guide tracks 142 are arranged on the treatment container 108 on the wall side—in particular, on a side wall 110.

The guide device 140 further comprises a plurality of guide rollers 148, by means of which the closing element 122 is displaceably mounted on the guide tracks 142.

The guide rollers 148 are in particular rotatably arranged on the closing element 122 and roll on or in the guide tracks 142.

Preferably, each guide track 142 is assigned one or more, e.g., two, guide rollers 148. One of the guide rollers 148 forms, for example, a lateral support roller 150, by means of which the closing element 122 can be prevented in particular from tilting about an axis running parallel to a direction of introduction. The direction of introduction is in particular that direction in which a workpiece 104 can be introduced through the access opening 114 into the treatment chamber 116.

The further guide roller 148 forms in particular a pressure roller 152 by means of which, in combination with a slotted guide 154 of the locking section 146, the closing element 122 can be moved in the direction of the side wall 110—in particular, onto a sealing element of the sealing device 138. A gap 156 between the closing element 122 and the side wall 110 can thus preferably be reduced by means of the pressure roller 152 and the slotted guide 154—in particular, in order to make clamping and thus sealing contact with a sealing element 158 of the sealing device 138 (see in this regard, for example, FIG. 6).

Figure 4:
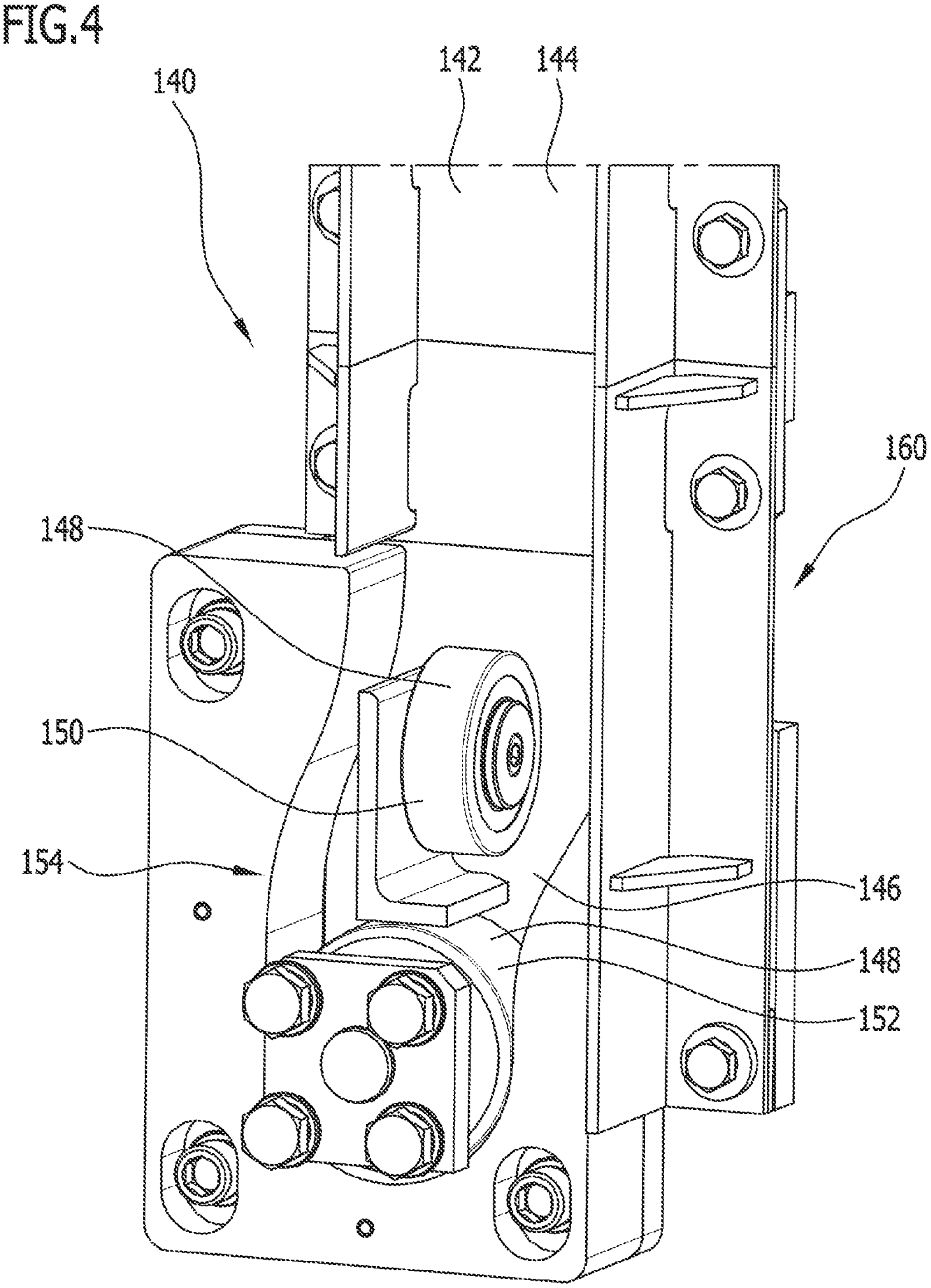
FIG. 4 shows a schematic perspectival view of a locking section of a guide device of the closing device from FIG. 2.
Figure 5:
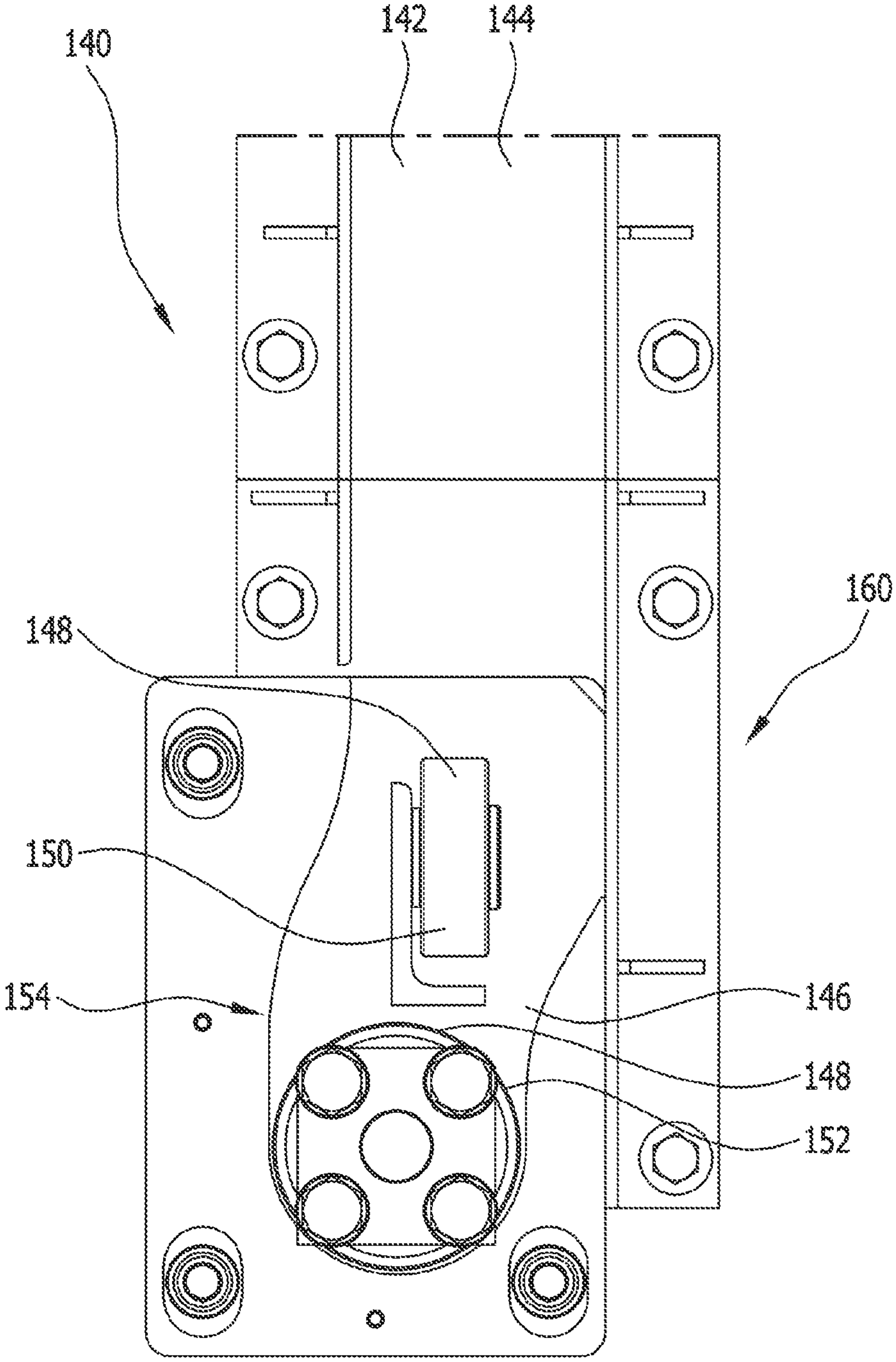
FIG. 5 shows a schematic plan view of the locking section as shown in FIG. 4.

As can be seen in particular from FIGS. 4 and 5, the locking section 146 of the guide track 142 runs obliquely to the vertical guide section 144 of the guide track 142.

In the closed position of the closing element 122 shown in FIGS. 2 to 5, the pressure roller 152 is arranged laterally offset relative to the vertical guide section 144 of the guide track 142.

The locking section 146 is designed to be significantly shorter compared to the vertical guide section 144, e.g., its length is at most approximately one fifth, e.g., at most approximately one tenth, of a length of the vertical guide section 144. As a result, the pressing movement of the closing element 122 can be limited to the time point shortly before the closed position is reached. The sealing element 158 is thereby contacted only shortly before reaching the closed position in order to avoid or at least minimize abrasion and thus long-term impairment of the sealing effect.

Each guide track 142 preferably forms a guide unit together with the guide rollers 148 guided thereon or therein.

In the closing device 120, four such guide units 160 are preferably provided, which are in particular arranged such that the closing element 122, which is in particular designed to be rectangular, is guided at all four corners.

The guide units 160 are positioned relative to one another in such a way that the pressure rollers 152 of each guide unit 160 engage in a synchronized manner with one another in the respective locking section 146, and the closing element 122 can thus be pressed uniformly against the sealing element 158 or can be moved in the direction thereof.

The movement of the closing element 122 in the direction of the sealing element 158 results from a mere deflection of the pressure roller 152 due to the shape of the slotted guide 154 and due to the vertical movement of the closing element 122 achieved by means of the closing drive 124 and/or due to gravity. An additional pressing mechanism for pressing the closing element 122 against the sealing element 158 and/or a movement device for moving the closing element 122 in the direction of the sealing element 158 can thereby preferably be dispensed with.

Various embodiments of sealing devices 138 are shown in FIGS. 6 to 11.

Each of the sealing devices 138 is preferably suitable for use in combination with the guide device 140 according to FIG. 1 and/or according to FIGS. 2 to 5.

The sealing device 138 comprises a sealing element 158 by means of which the gap 156 between the closing element 122 and the side wall 110 of the treatment container 108 can be sealed.

For this purpose, the side wall 110 comprises a sealing surface 162—in particular, a wall-side sealing surface 162.

The sealing surface 162 of the side wall 110 is in particular arranged on an inner side, facing the treatment chamber 116, of the side wall 110.

The closing element 122 can thus be applied to the side wall 110 from the inside.

A fluid pressure generated by the fluid during flooding of the treatment container 108 thereby causes the closing element 122 to be pressed against the side wall 110.

Alternatively to this, the closing element 122 can also be arranged on an outer side of the side wall 110. The sealing surface 162 would then accordingly be arranged on the outside of the side wall 110, and a force brought about by the fluid pressure would push the closing element 122 outwards from the side wall 110. Given a suitable design of the guide device 140 and the sealing device 138, this alternative arrangement of the closing element 122 can also be provided.

However, the inner arrangement of the closing element 122 is preferred.

Figure 6:
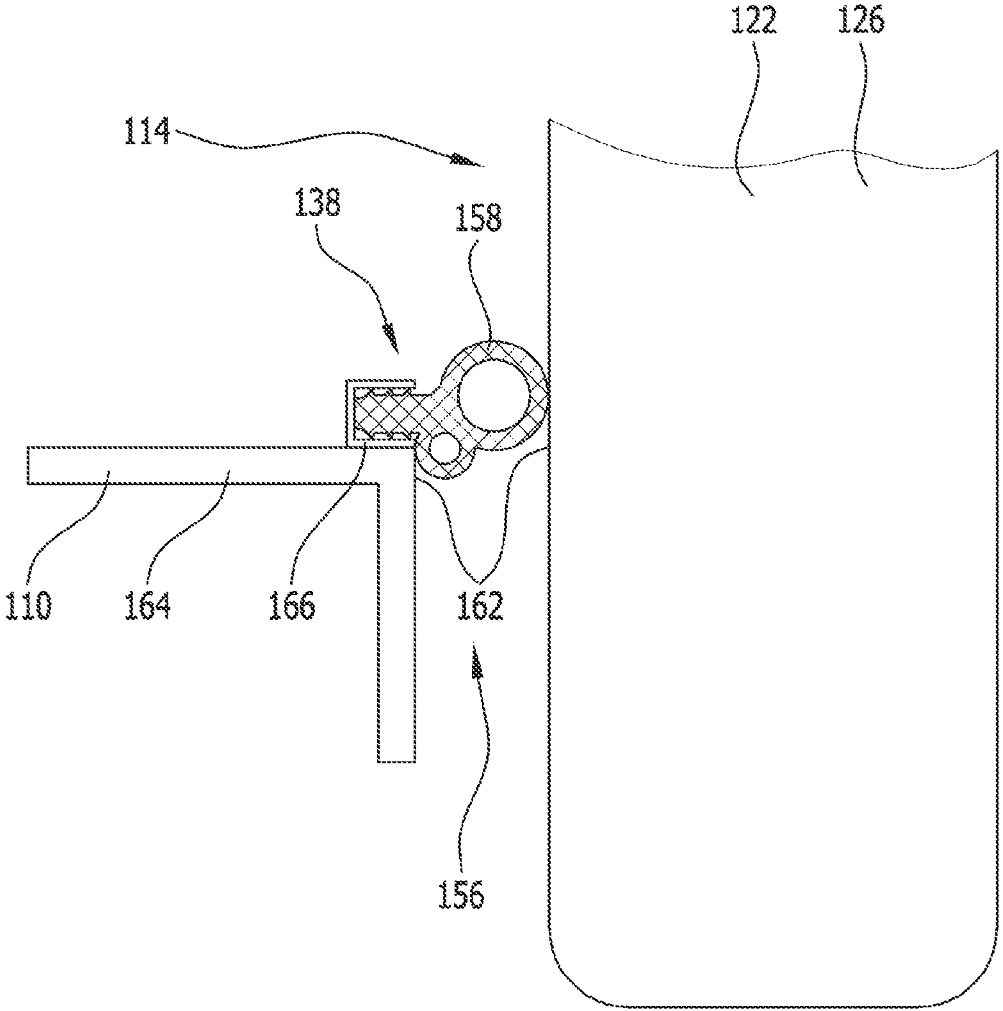
FIGS. 6 to 11 show various embodiments of sealing devices for sealing a gap between a closing element of the closing device and a side wall of the treatment container of the treatment station.

In the embodiment of the sealing device 138 shown in FIG. 6, the sealing element 158 is preferably designed to be compressible—in particular, elastically deformable. Tolerances in the size of the gap 156 can preferably be compensated for in this way. In particular, tolerance compensation can preferably also be provided for a variation of the gap width of at least 3 mm—preferably at least approximately 5 mm.

The sealing surface 162 of the side wall 110 is in particular formed on a flange ring 164. The flange ring 164 preferably surrounds the access opening 114 in an annular or at least U-shaped manner and is preferably a component of the side wall 110.

The sealing element 158 can be formed, for example, from an elastomer material and/or from a foam material—for example, a plastic foam.

The sealing element 158 preferably has an annularly closed shape or a U-shape.

The sealing element 158 preferably extends at least approximately along the entire flange ring 164.

In the embodiment of the sealing element 158 shown in FIG. 6, this has, for example, a tubular cross-section, wherein in particular one or more, e.g., two, cylindrical—in particular, circular-cylindrical—cavities are arranged and/or formed within the sealing element 158. In particular, the compressibility of the sealing element 158 can thereby be ensured. A sealing effect is achieved in particular by sufficient compression of the sealing element 158 due to the pressing of the closing element 122.

In particular, in order to reduce a friction effect and thus to minimize abrasion on the sealing element 158, it can be provided that the sealing element 158 and/or a sealing surface 162 resting thereon—in particular, a sealing surface 162 of the closing element 122—be coated—for example, with an adhesion-reducing and/or friction-reducing coating.

The sealing element 158 can, for example, be fixed to the sealing surface 162—in particular, fixed in a form-fitting and/or force-fitting and/or materially bonded manner.

For example, it can be provided that a sealing element seat 166, e.g., a receiving groove or a receiving profile, be arranged and/or formed on the flange ring 164. In particular, the sealing element 158 can then be clamped in the sealing element seat 166—for example, with a form fit by means of a pin profile.

Figure 7:
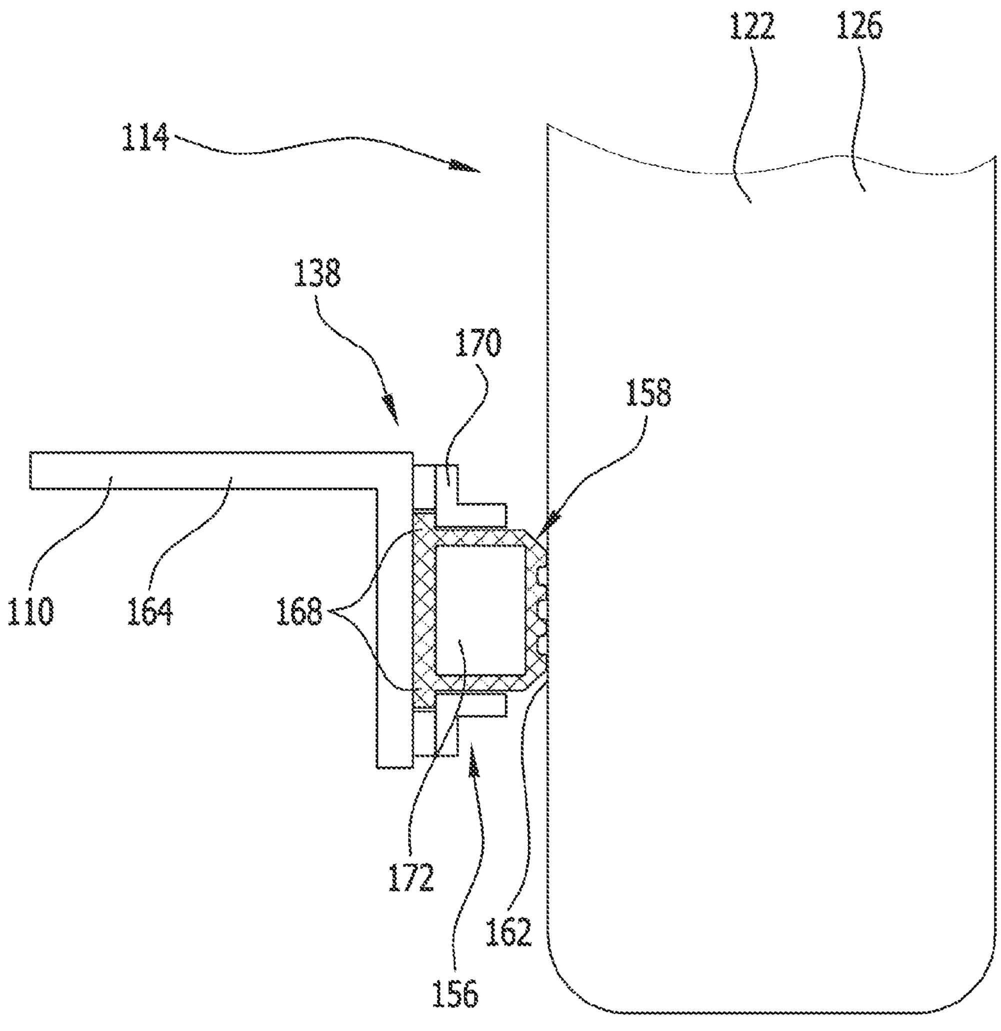
Figure 8:
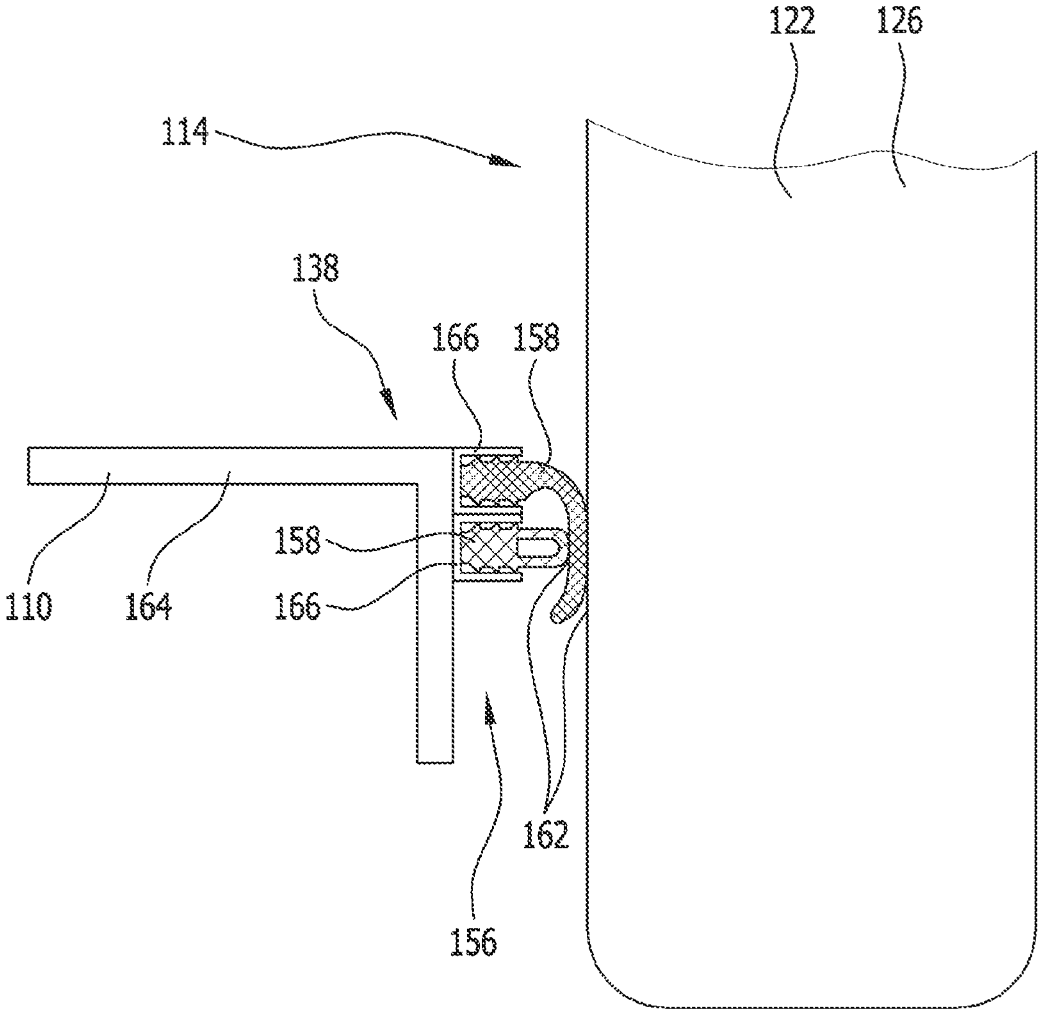
Figure 9:
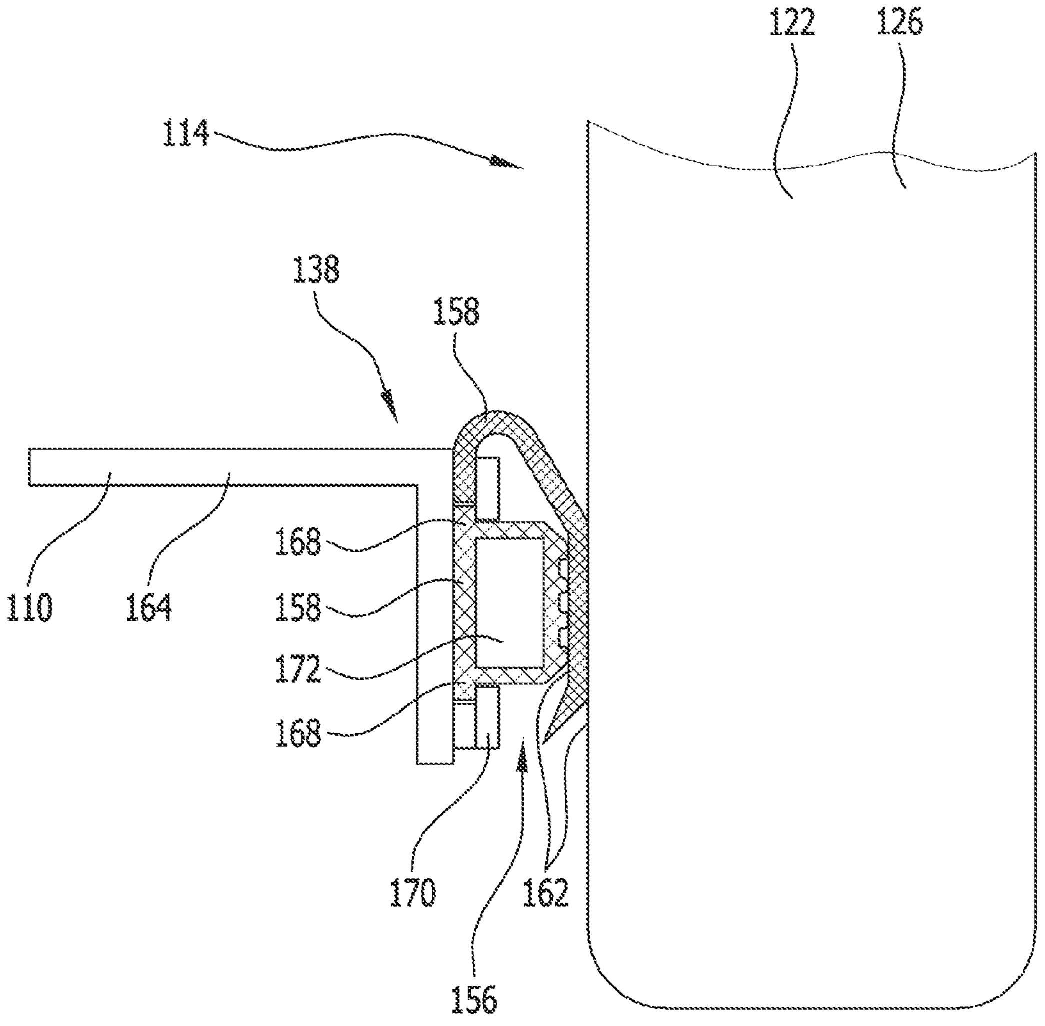

As can be seen in particular from FIG. 7, in an alternative embodiment of the sealing element 158, this can have one or more lateral projections 168, by means of which the sealing element 158 is clamped to the side wall 110—in particular, to the flange ring 164—for example, by one or more clamping elements 170.

The clamping elements 170 can in particular be clamping rails.

The sealing element 158 can in particular have a T-shaped cross-section in order to be fixed on both sides by means of clamping elements 170.

An interior 172 of the sealing element 158 can, for example, be designed to be fillable. For example, a fluid can be introduced into the interior 172. For example, it can be provided that a pressure be able to be set in the interior 172 in order to be able to expand the sealing element 158.

In particular, the sealing element 158 can be designed in such a way that it can be applied to the closing element 122 only by its expansion—for example, as soon as the latter is arranged in the closed position. The gap 156 then preferably closes only by expanding the sealing element 158.

The fluid introduced into the interior 172 can be gas or liquid, for example. For example, compressed air can be used for this purpose.

It can be advantageous if the pressure in the interior 172 of the sealing element 158 is monitored by means of a sensor device and/or control device. A reliable sealing effect can thereby be ensured. Furthermore, an undesired escape of fluid, which could lead to impairment of the sealing effect, can preferably be detected in good time.

It can be advantageous if one or more clamping elements 170 for fixing the sealing element 158 simultaneously have a stabilizing function—in particular, in order to avoid an undesirably strong lateral deformation of the sealing element 158 during the expansion thereof.

In FIGS. 8 to 11, various embodiments of the sealing device 138 are shown in which a plurality of sealing elements 158 are provided.

A primary seal, facing the fluid in the interior of the treatment chamber 116, and a secondary seal facing away from the fluid are provided in each case.

Depending upon the arrangement of the closing element 122 on the inside or the outside of the side wall 110, a varying arrangement of the two sealing elements 158 between the closing element 122 and the side wall 110 preferably results. The two sealing elements 158 can in particular be designed to overlap one another, wherein in particular an expandable sealing element 158 acts against a further sealing element 158 in order to press it against the closing element 122 (see in particular FIGS. 8, 9, and 11).

Figure 10:
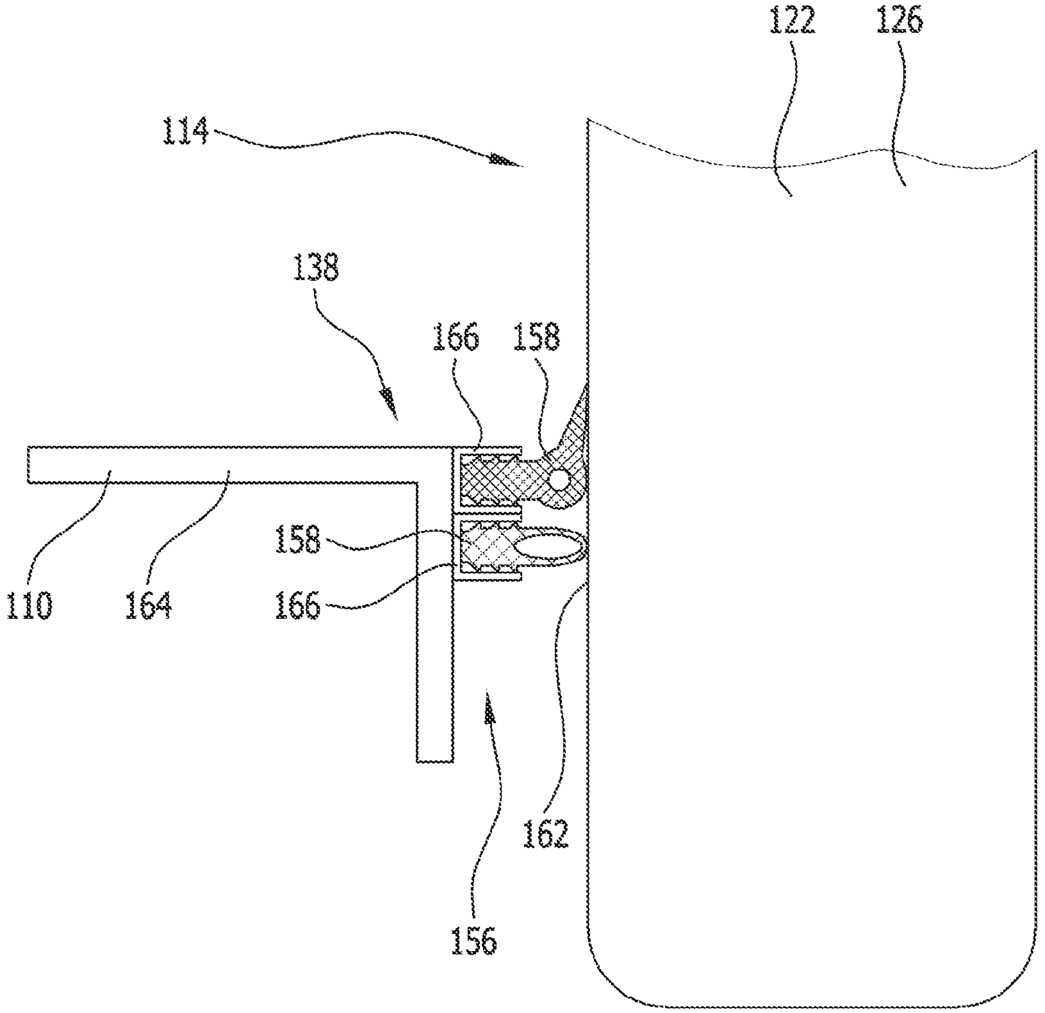
Figure 11:
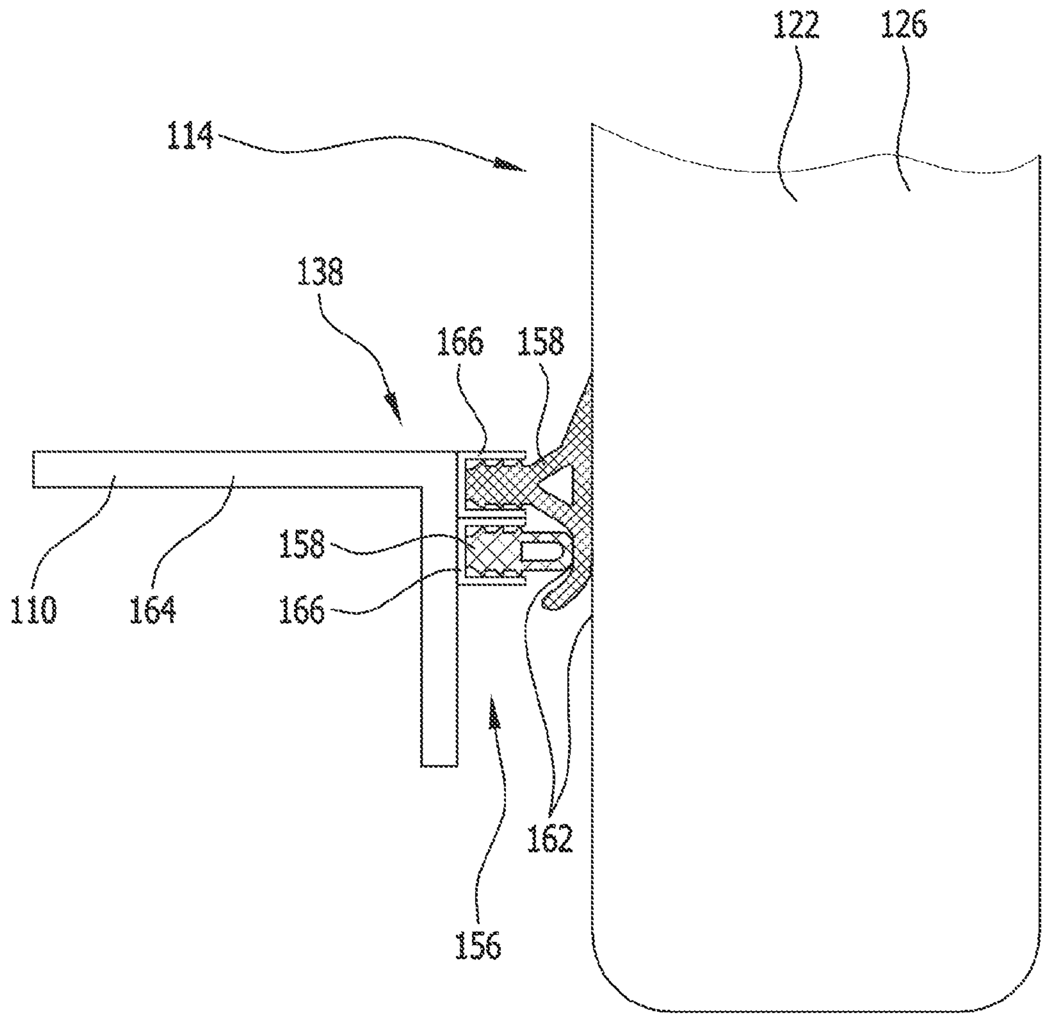

Alternatively, it can also be provided that each of the sealing elements 158 act directly upon the closing element 122 (see FIG. 10).

A sealing edge geometry or sealing surface geometry of the respective sealing elements 158 is in particular adapted to the pressure conditions to be expected and to the gap size.

In principle, any of the embodiments of the sealing device 138 shown in FIGS. 6 to 11 are suitable for use in any of the described embodiments of treatment stations 100.

Figure 12:
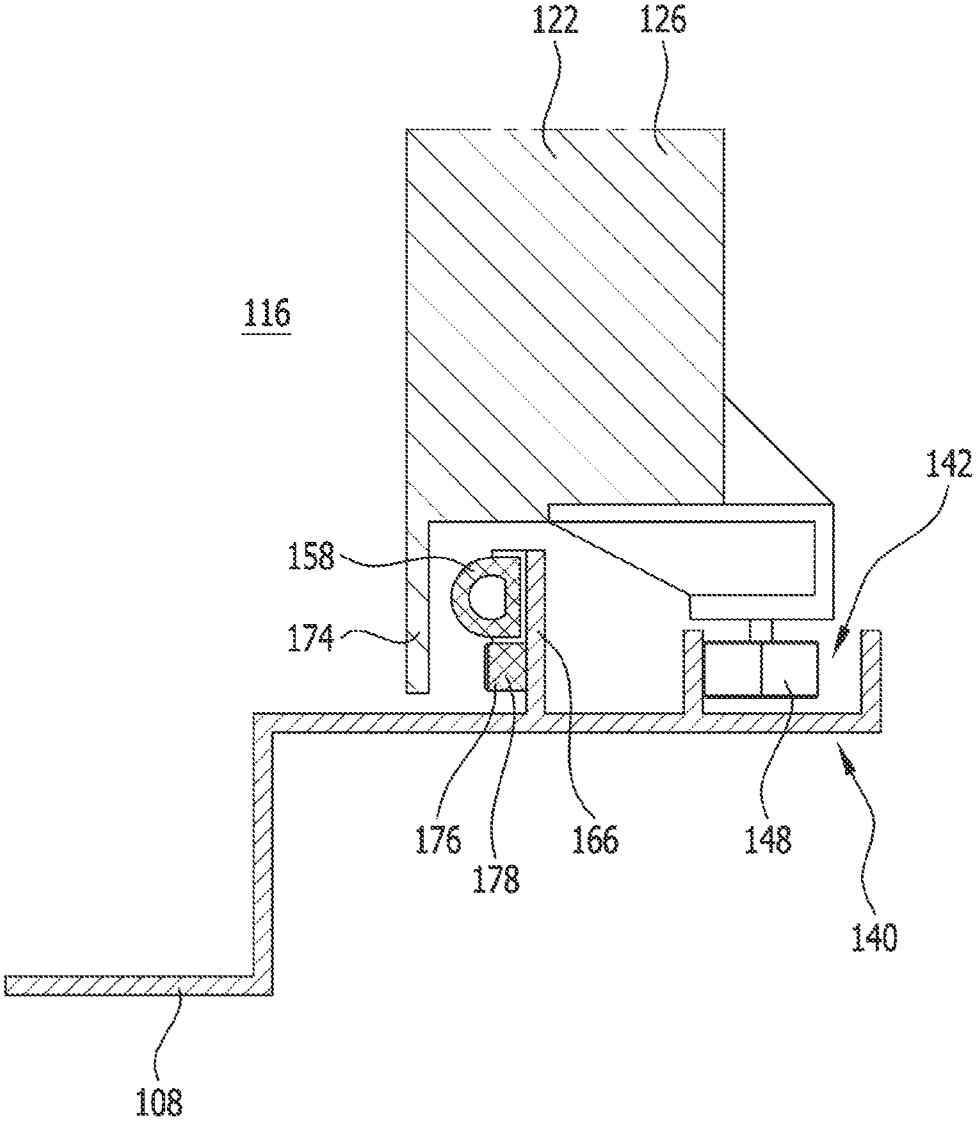
FIG. 12 shows a schematic section through an alternative embodiment of a closing device.

FIG. 12 shows a (further) alternative embodiment of a closing device 120 in which the guide device 140 is arranged outside the treatment chamber 116, and thus the guide rollers 148 do not come into contact with the fluid, or at least the guide tracks 142 are not flooded with the fluid.

In order nevertheless to use a fluid pressure within the treatment chamber 116 for pressing the closing element 122 against the sealing element 158, the closing element 122 preferably comprises a projection 174 engaging behind or around the sealing element 158. The projection 174 is in particular arranged and/or designed such that the sealing element 158 is arranged between the projection 174 and the guide tracks 142. In particular, the projection 174 projects, on an inner side facing the treatment chamber 116, beyond the sealing element 158.

For example, it can be provided that the sealing element 158 project, with a sealing element seat 166 bearing the sealing element 158, into a spatial region arranged between the projection 174 and the guide tracks 142.

The sealing element seat 166 can optionally comprise a stopper 176 and/or a spacer 178 in order to be able to limit a maximum deformation of the sealing element 158.

Moreover, the embodiment of a closing device 120 shown in FIG. 12 preferably corresponds to one or more of the other embodiments with regard to individual or several features relating to the structure and/or the function, so that reference is made to their description above in this respect.

Figure 13:
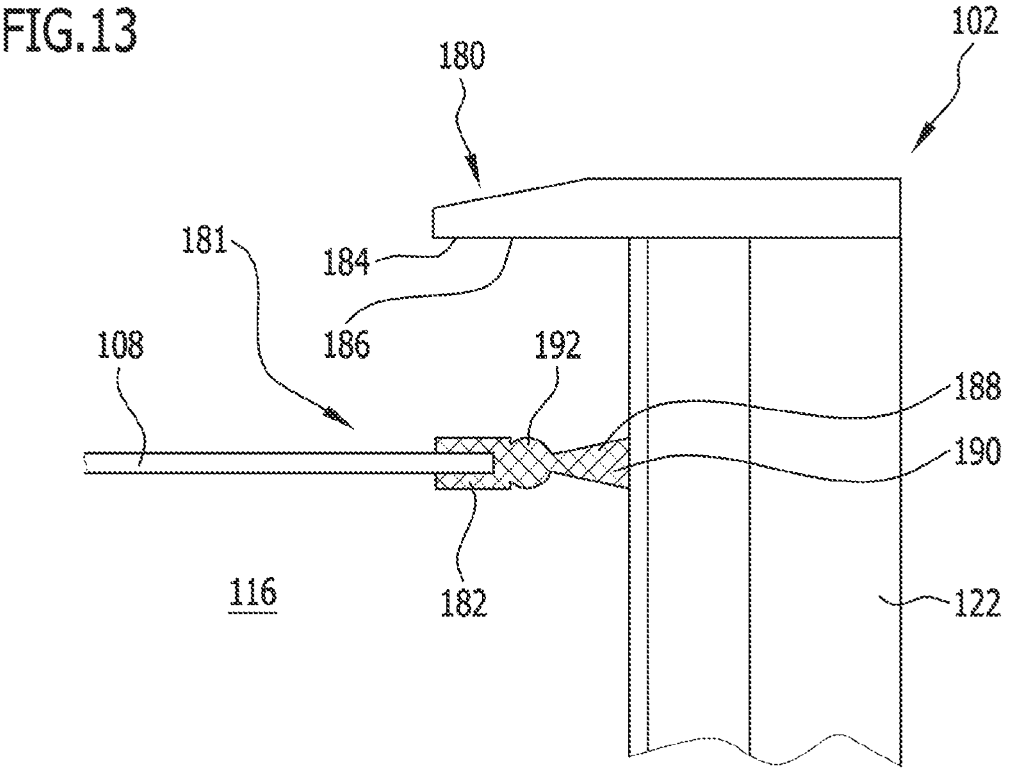
FIG. 13 shows a schematic section through an additional seal for sealing a gap in a ceiling region of the treatment container, wherein the closing element is arranged in an at least partially open state.
Figure 14:
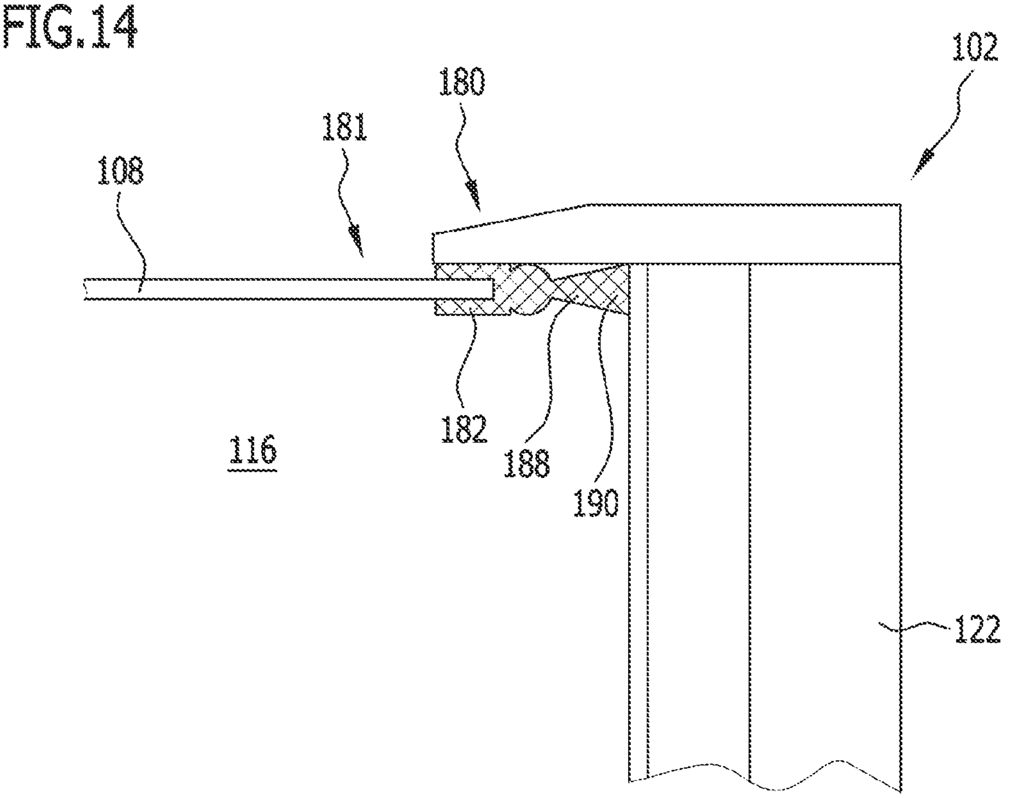
FIG. 14 shows a view, corresponding to FIG. 13, of the additional seal, wherein the closing element is arranged in a closed position.

FIGS. 13 and 14 show an optional development of the closing device 120 in which an additional seal 180 is provided on an upper end, with respect to the direction of gravity, of the closing element 122. Such an additional seal 180 can be advantageous in particular if the closing element 122 is guided in a gap or through a gap in a ceiling region 181 of the treatment container 108, and, under certain circumstances, vapors or other media could escape through this gap.

The additional seal 180 can in particular comprise an additional sealing element 182 which is arranged, for example, on the treatment container 108 and acts against the closing element 122. Alternatively, the additional sealing element 182 can be arranged on the closing element 122 and act against the treatment container 108.

The closing element 122 can comprise, for example, a pressing section 184—in particular, a pressing projection 186—against which the additional sealing element 182 can be pressed or is pressed—in particular, in a closed state of the closing element 122.

The additional sealing element 182 can, for example, comprise a sealing lip part 188 or brush part 190 which, in each position of the closing element 122, covers or bridges a gap between the treatment container 108 and the closing element 122, and thus at least largely closes the same.

Alternatively or additionally thereto, it can be provided that the additional sealing element 182 comprise a pressed part 192 which is sealingly pressed against the closing element 122—in particular, exclusively—when it is in a closed position. The pressed part 192 is in particular a rubber lip or another elastic seal.

Furthermore, alternatively or additionally, it can be provided that a pressing section 184—in particular, a pressing projection 186—form the additional sealing element 182 and, in particular, act against the treatment container 108 in the closed state of the closing element 122 in order to at least largely close a gap between the treatment container 108 and the closing element 122.

List of Reference Signs

100 Treatment station
102 Treatment system
104 Workpiece
106 Vehicle body
108 Treatment container
110 Side wall
112 End wall
114 Access opening
116 Treatment chamber
118 Conveying device
120 Closing device
122 Closing element
124 Closing drive
126 Gate
128 Lifting device
130 Fluid tank
132 Fluid guide
134 Control device
136 Valve device
138 Sealing device
140 Guide device
142 Guide track
144 Vertical guide section
146 Locking section
148 Guide roller
150 Support roller
152 Pressing roller
154 Slotted guide
156 Gap
158 Sealing element
160 Guide unit
162 Sealing surface
164 Flange ring
166 Sealing element seat
168 Projection
170 Clamping element
172 Interior
174 Projection
176 Stopper
178 Spacer
180 Additional seal
181 Ceiling region
182 Additional sealing element
184 Pressing section
186 Pressing projection
188 Sealing lip part
190 Brush part
192 Pressed part

The invention claimed is:

1. Treatment station for treating workpieces,
wherein the treatment station comprises a treatment container which surrounds a treatment chamber for accommodating the workpieces,
wherein the treatment chamber can be flooded with a fluid,
wherein the treatment container includes at least one access opening for introducing the workpieces into the treatment chamber and/or for removing the workpieces from the treatment chamber,
wherein the treatment container includes a closing device which includes a closing element for selectively closing and opening the at least one access opening,
wherein the treatment station includes a guide device for guiding the closing element,
wherein the guide device includes one or more vertical guide sections and one or more locking sections,
wherein the one or more locking sections run transversely to the one or more vertical guide sections,
wherein the treatment station includes a sealing device for sealing a gap between the treatment container and the closing element in a closed state thereof,
wherein the sealing device includes one or more expandable sealing elements which can be selectively brought into a sealing expansion and into a release expansion, and
wherein the one or more sealing elements are applied by expansion to the closing element, when the closing element is arranged in a closed position.

2. Treatment station according to claim 1, wherein the one or more locking sections, obliquely to the one or more vertical guide sections.

3. Treatment station according to claim 1, wherein the one or more vertical guide sections are arranged and/or aligned at least approximately parallel to a wall-side sealing surface of the treatment container.

4. Treatment station according to claim 1, wherein the one or more locking sections:
a) each connect to a lower end—in the vertical direction—of a vertical guide section; and/or
b) extend starting from a vertical guide section in the direction of a wall-side sealing surface of the treatment container.

5. Treatment station according to claim 1, wherein the closing element is displaceably mounted on the one or more vertical guide sections and/or on the one or more locking sections by a plurality of guide rollers and/or support rollers of the guide device.

6. Treatment station according to claim 1, wherein the closing element is displaceable unchanged in a uniform rotational alignment along the one or more vertical guide sections and/or along the one or more locking sections.

7. Treatment station according to claim 1, wherein the closing element can be moved by the one or more locking sections onto a wall-side sealing surface of the treatment container to receive a sealing element in a clamping and/or sealing manner between the closing element and the treatment container.

8. Treatment station according to claim 1, wherein the guide device and/or the closing element are arranged on an inner side, facing the treatment chamber, of a side wall of the treatment container.

9. Treatment station according to claim 1, wherein the closing device includes a lifting device for raising and lowering the closing element of the closing device.

10. Treatment station according to claim 1, wherein the sealing device includes one or more sealing elements designed as elastic profile seals.

11. Treatment station according to claim 1, wherein the one or more expandable sealing elements which can be selectively brought into the sealing expansion and into the release expansion by introducing an expansion material.

12. Treatment station according to claim 1, wherein the sealing device includes one or more primary sealing elements and one or more secondary sealing elements to functionally support the one or more primary sealing elements.

13. Treatment station according to claim 1, wherein the sealing device includes a fluid collection device by which fluid exiting the gap can be received.

14. Treatment system comprising one or more treatment stations, wherein the treatment station includes a treatment container which surrounds a treatment chamber for accommodating workpieces, wherein the treatment chamber can be flooded with a fluid, wherein the treatment container includes at least one access opening for introducing the workpieces into the treatment chamber and/or for removing the workpieces from the treatment chamber, wherein the treatment container includes a closing device which includes a closing element for selectively closing and opening the at least one access opening, wherein the treatment station includes a guide device for guiding the closing element, wherein the guide device includes one or more vertical guide sections and one or more locking sections, wherein the one or more locking sections run transversely to the one or more vertical guide sections, wherein the treatment station includes a sealing device for sealing a gap between the treatment container and the closing element in a closed state thereof, wherein the sealing device includes one or more expandable sealing elements which can be selectively brought into a sealing expansion and into a release expansion, and wherein the one or more sealing elements are applied by expansion to the closing element, when the closing element is arranged in the closed position.

15. Method for treating workpieces using a treatment station or a treatment system for treating workpieces wherein the treatment station includes a treatment container which surrounds a treatment chamber for accommodating the workpieces, wherein the treatment chamber can be flooded with a fluid, wherein the treatment container comprises at least one access opening for introducing the workpieces into the treatment chamber and/or for removing the workpieces from the treatment chamber, wherein the treatment container comprises a closing device which comprises a closing element for selectively closing and opening the at least one access opening, the method comprising:

introducing the workpieces through at least one access opening into a treatment chamber which can be flooded with a fluid and which is surrounded by a treatment container of a treatment station; and optionally closing and opening the at least one access opening by a closing element of a closing device of the treatment container, wherein the treatment station includes a guide device for guiding the closing element, wherein the guide device includes one or more vertical guide sections and one or more locking sections, wherein the one or more locking sections run transversely to the one or more vertical guide sections, wherein the treatment station includes a sealing device for sealing a gap between the treatment container and the closing element in a closed state thereof, wherein the sealing device includes one or more expandable sealing elements which can be selectively brought into a sealing expansion and into a release expansion, and wherein the one or more sealing elements are applied by expansion to the closing element, when the closing element is arranged in a closed position.

16. Method according to claim 15, wherein the treatment station includes a sealing device for sealing a gap between the treatment container and the closing element in the closed state thereof, wherein the sealing device includes one or more expandable sealing elements which are selectively brought into a sealing expansion and a release expansion by introducing an expansion material, wherein the sealing element is expanded in the sealing expansion, and wherein the sealing element is relaxed in the release expansion.

17. Method according to claim 16, wherein a sensor device and/or control device is to monitor, control and/or regulate a pressure in an interior of the sealing element.

* * * * *